Dec. 15, 1931.  E. A. PERRIN  1,836,617
FLYING APPARATUS
Filed Nov. 3, 1928  11 Sheets-Sheet 1
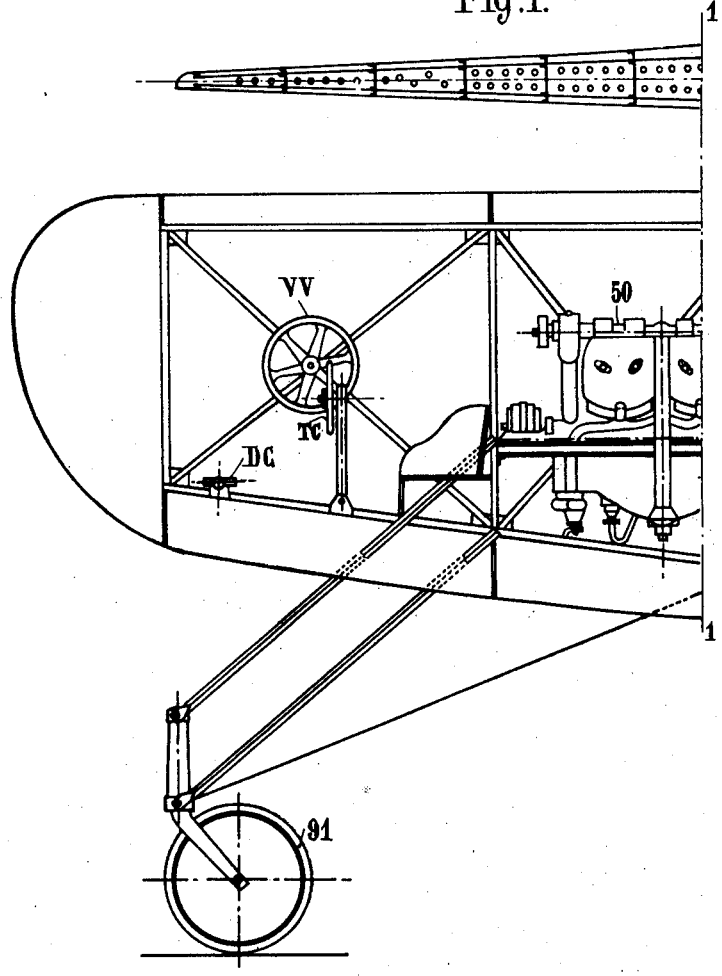
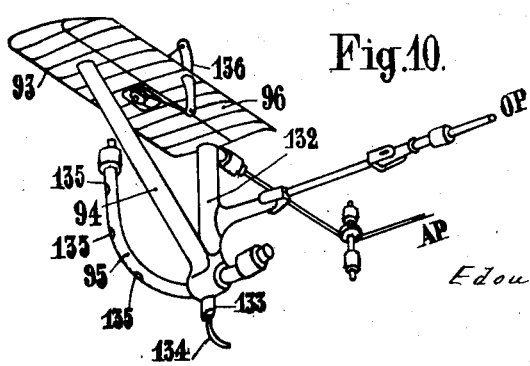
INVENTOR:
Edouard Alfred Perrin
BY
ATTORNEY

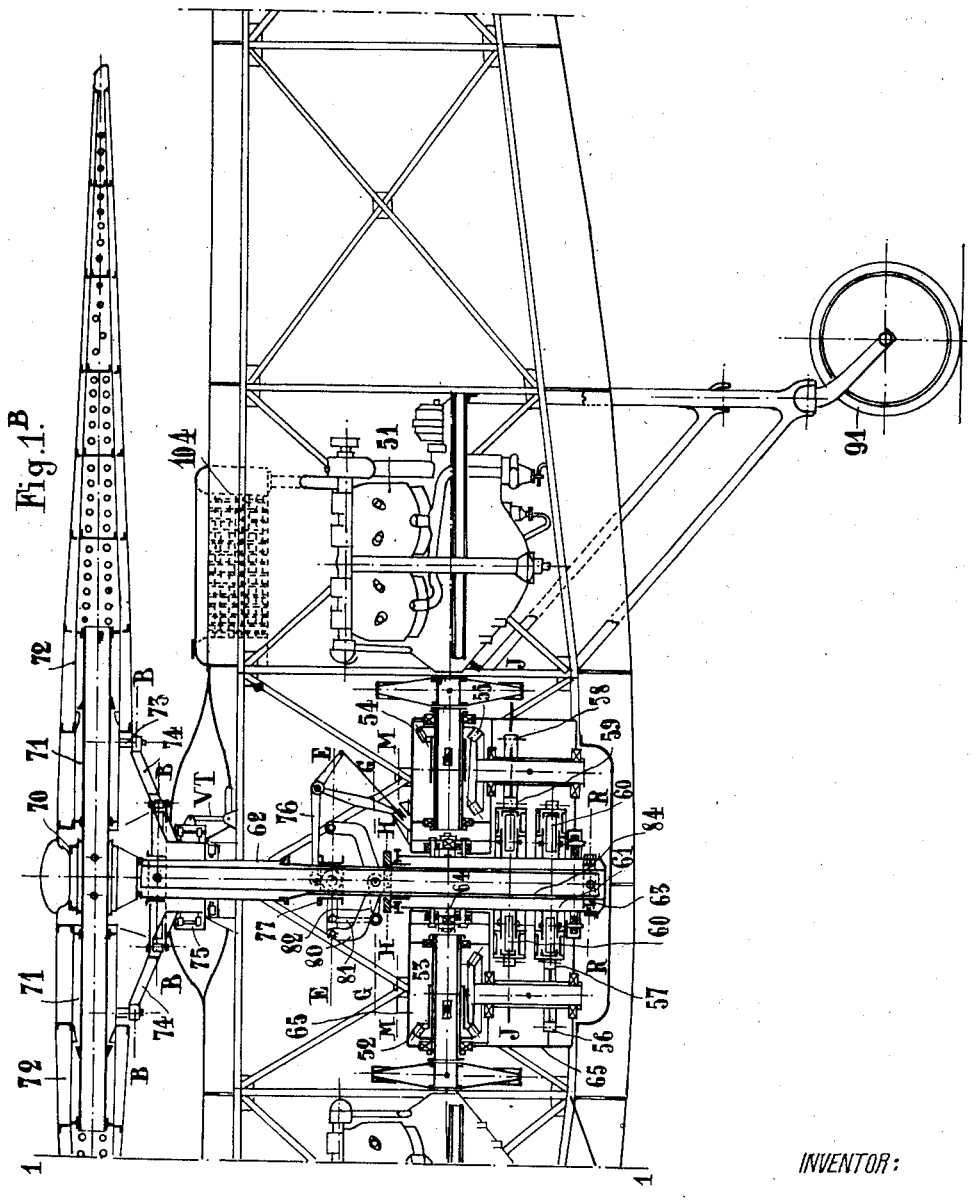

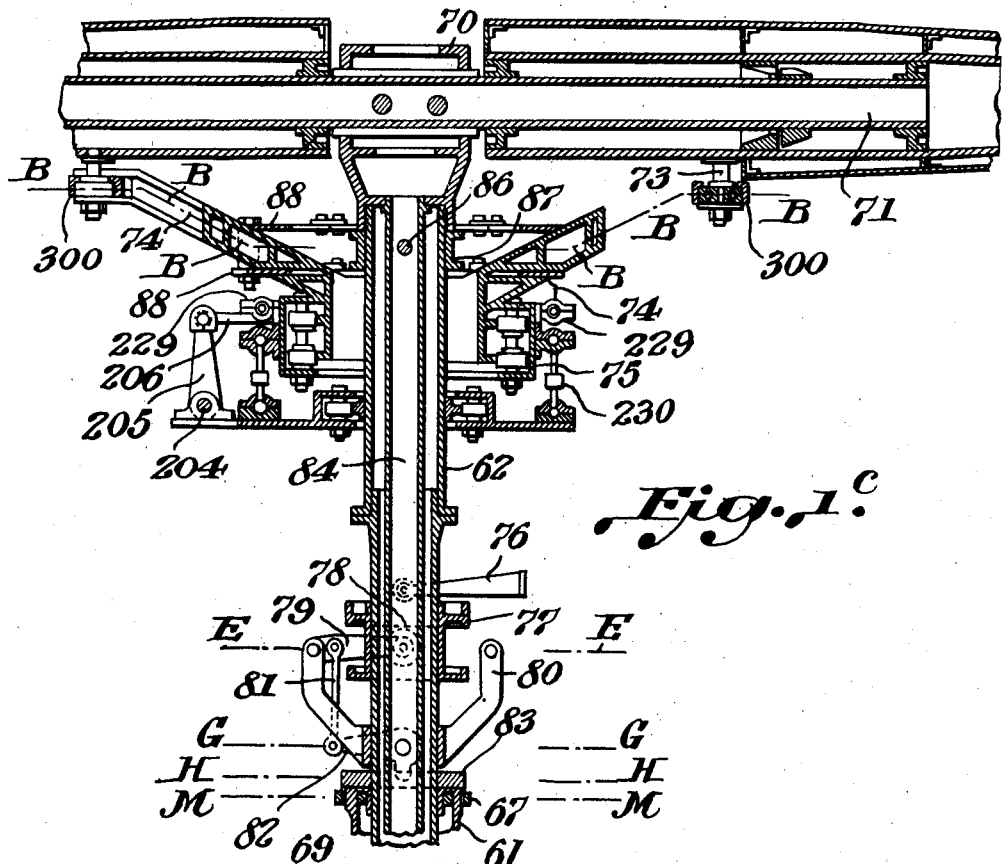
Fig. 1.C
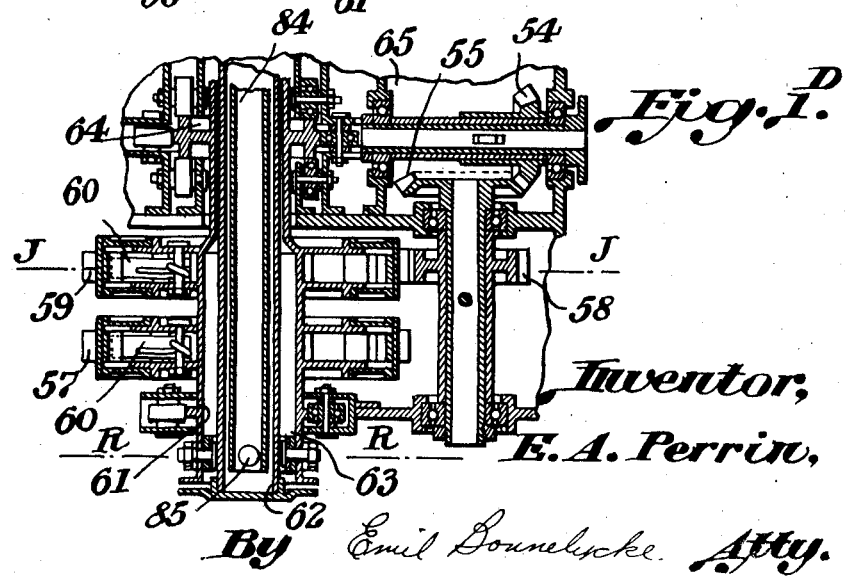
Fig. 1.D

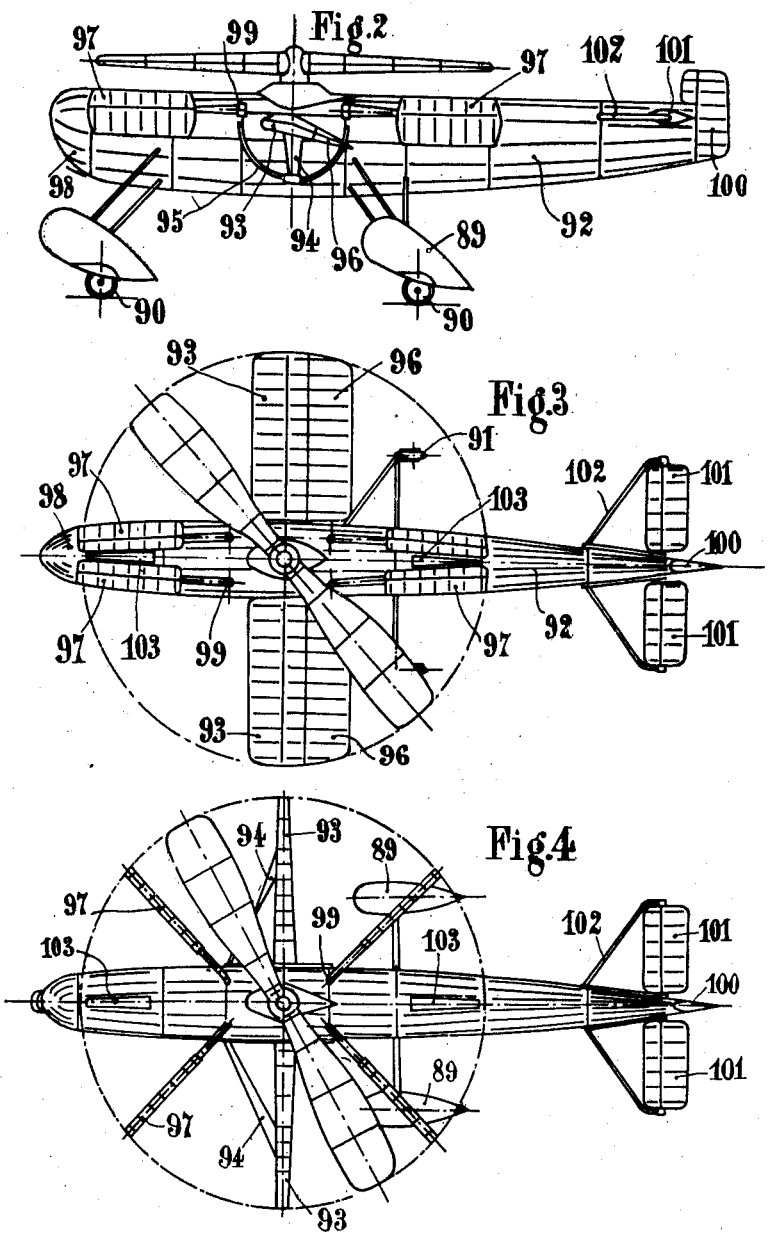

Dec. 15, 1931.　　　　　E. A. PERRIN　　　　　1,836,617
FLYING APPARATUS
Filed Nov. 3, 1928　　　　11 Sheets-Sheet 5

Inventor:
E. A. Perrin,

By Emil Bonnelycke Atty.

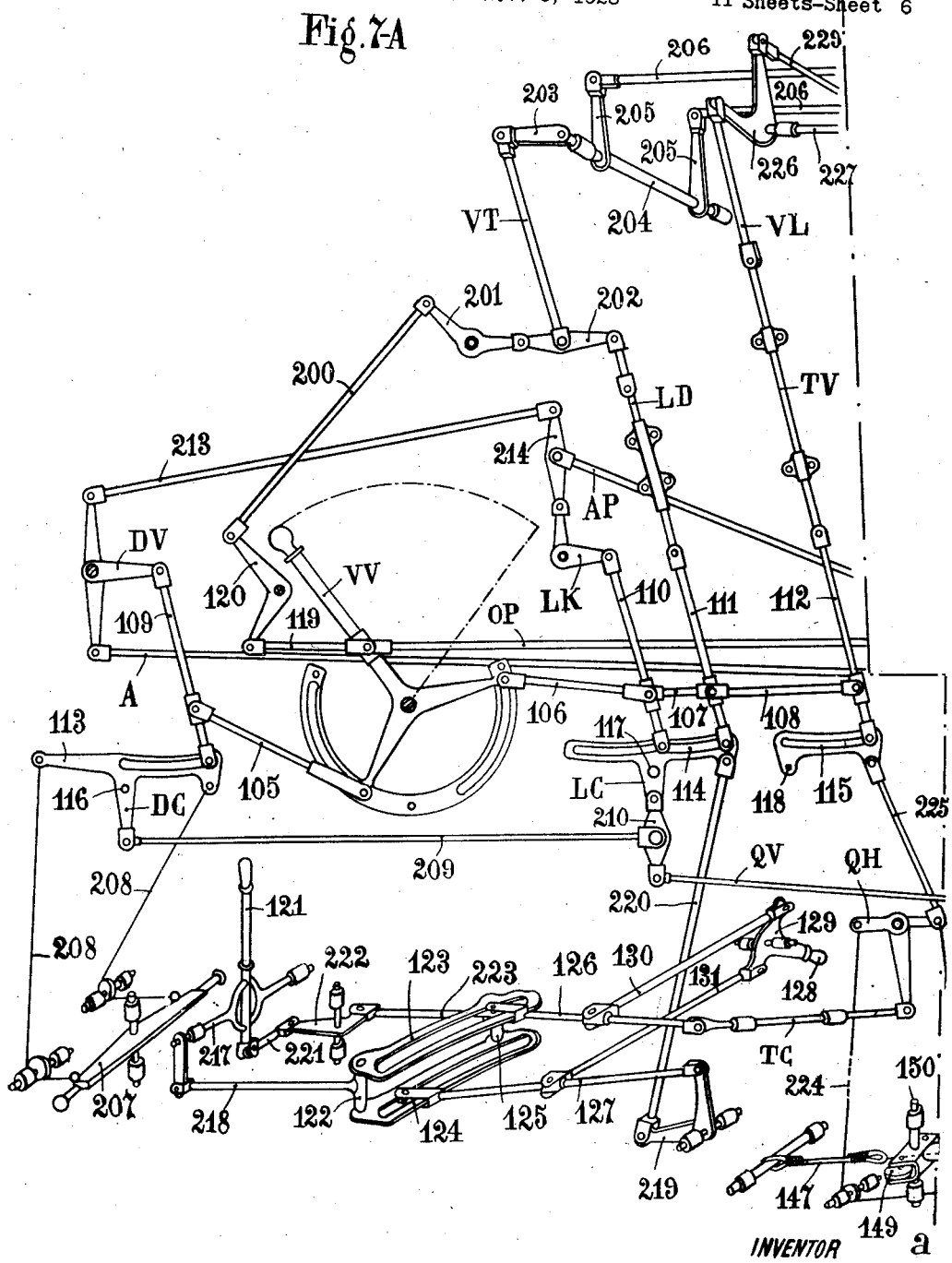

Dec. 15, 1931.  E. A. PERRIN  1,836,617
FLYING APPARATUS
Filed Nov. 3, 1928   11 Sheets-Sheet 7
Fig. 7-B.
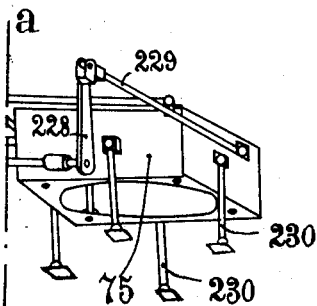
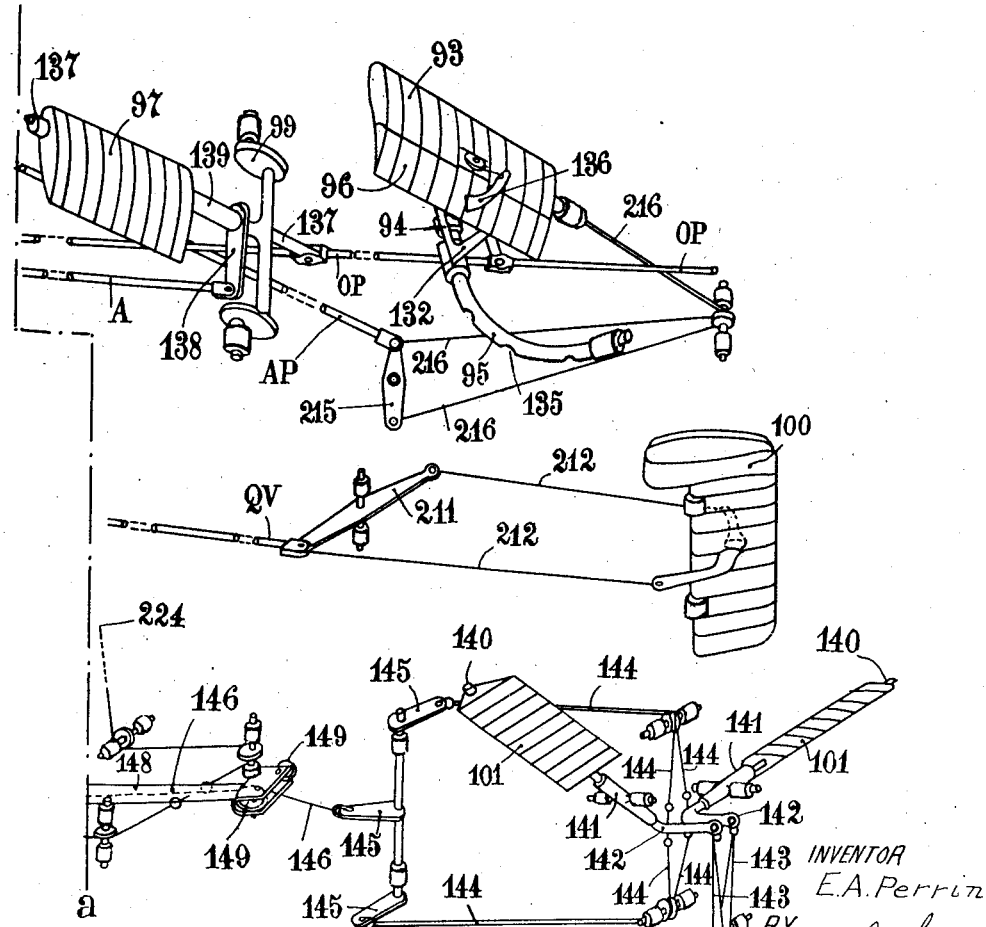
INVENTOR
E. A. Perrin
BY
Emil Bönnelycke
ATTORNEY

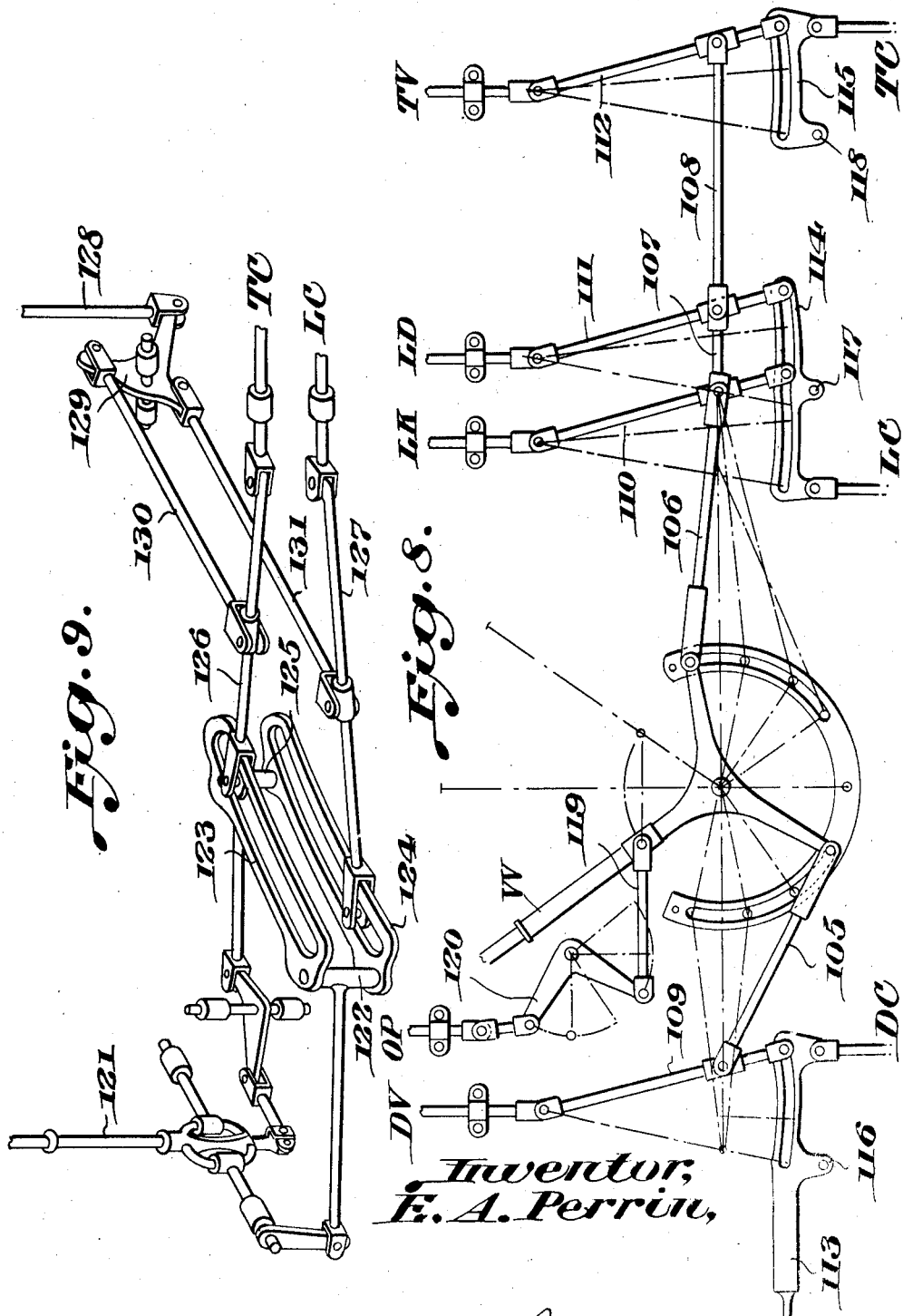

Dec. 15, 1931.        E. A. PERRIN        1,836,617
FLYING APPARATUS
Filed Nov. 3, 1928        11 Sheets-Sheet 9
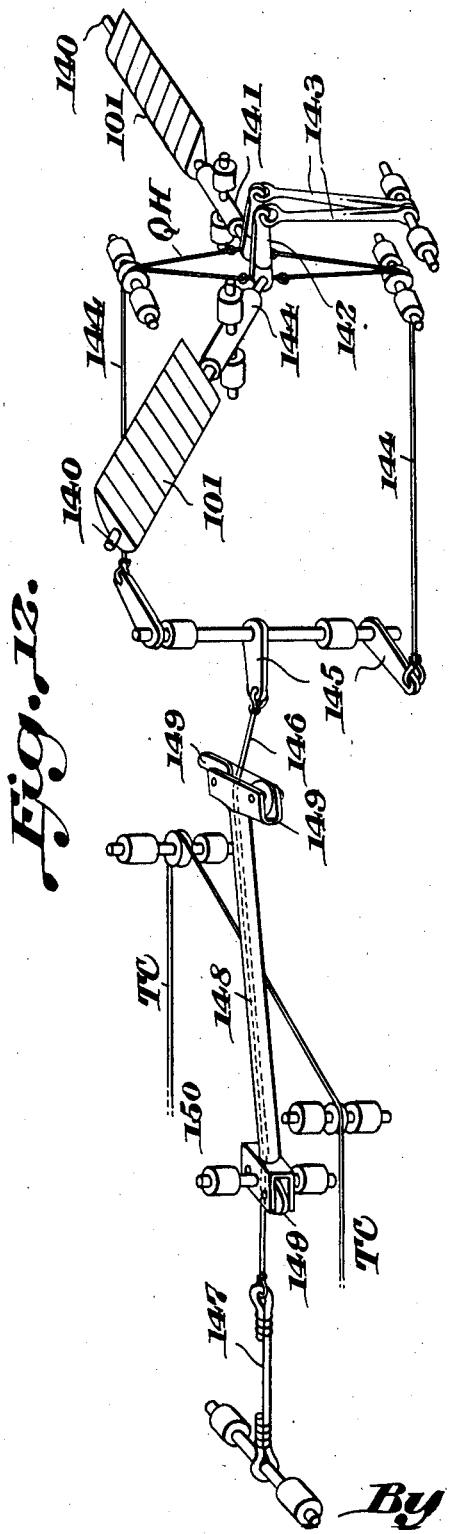
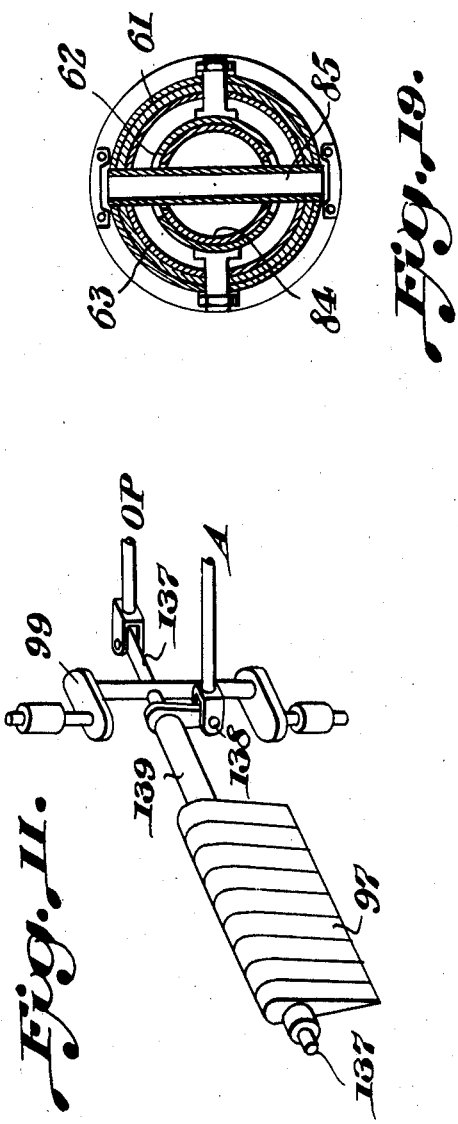
Inventor,
E. A. Perrin,
By Emil Bonnelycke Atty.

Dec. 15, 1931.  E. A. PERRIN  1,836,617
FLYING APPARATUS
Filed Nov. 3, 1928  11 Sheets-Sheet 10

Inventor,
E. A. Perrin

By Emil Bonnelycke Atty.

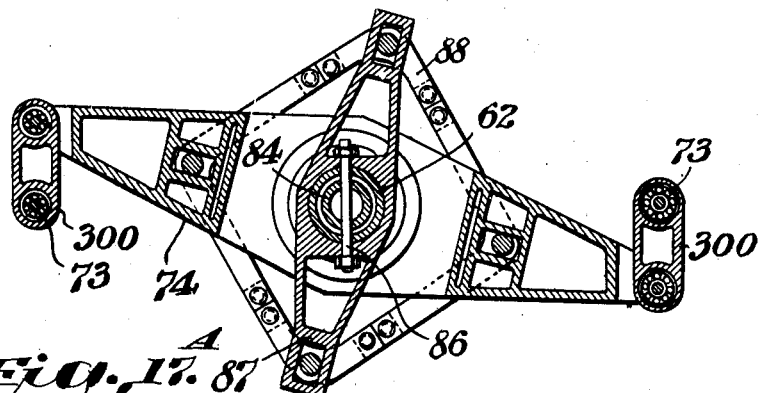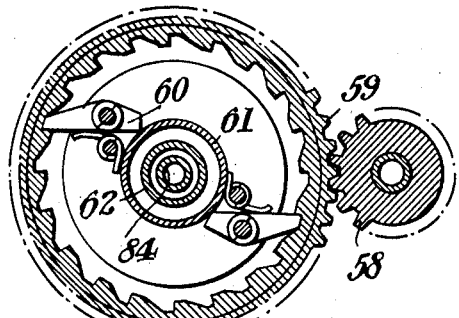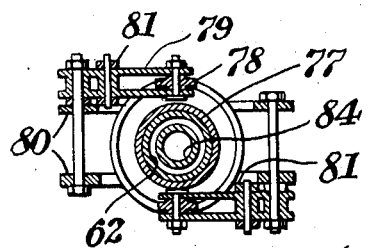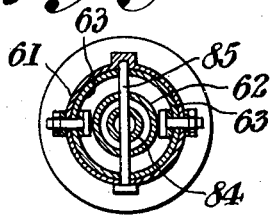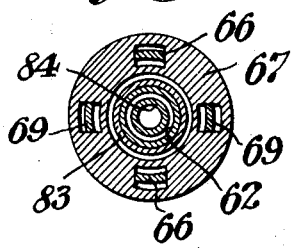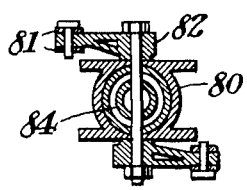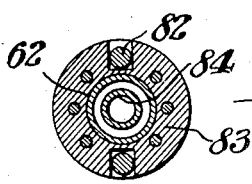

Patented Dec. 15, 1931

1,836,617

UNITED STATES PATENT OFFICE

EDOUARD ALFRED PERRIN, OF LE VESINET, FRANCE

FLYING APPARATUS

Application filed November 3, 1928, Serial No. 316,965, and in France November 19, 1927.

This invention has for its object a flying apparatus which is able, according to the pilot's will:

(a) To ascend, descend and land vertically with operative or inoperative engines;

(b) To move horizontally at high speed or along any inclined path, with operative or inoperative engines;

(c) To glide along a descending path, but one very close to the horizontal, with inoperative engines and screw and, in such conditions, to land like an airplane of ordinary pattern, such results being obtained by the use of one single both sustaining and propelling screw and complementary members as described hereinafter.

The characteristic devices of this invention are to be described in detail with reference to the accompanying drawings.

Taken generally, these devices comprise:

In combination with a sustaining variable pitch screw mounted on a substantially vertical shaft:

1. A plurality of main surfaces hereinafter termed lateral planes arranged in pairs at the right and left of the body (see Figures 2-6) or, eventually, between the bodies if there are a plurality thereof.

The lateral planes, the number of which may be reduced to two, extend laterally so as to cover the greatest part of the diameter of the circle swept over by the screw and the span of which may be greater than said diameter.

These planes are swingable about axes substantially horizontal and perpendicular to the axis of the sustaining screw or perpendicular to the median plane of the body.

They may optionally be provided with winglets in their hind portions wherefrom the air threads escape after they have swept the surface of the planes; these winglets are swingable about axes substantially parallel to the axis of rotation of the planes.

2. Auxiliary surfaces hereinafter termed blades, utilized optionally as an accessory and complement; these blades are located in the intervals which remain free between the main planes themselves (see Figures 2-6). In the case when the number of main planes is reduced to two, that of the blades may preferably be reduced to four. These blades extend over the greater part of the circle swept over by the screw, preferably towards the periphery thereof, but they may, without inconvenience, extend beyond that circle. They must be the broader as their distances between one another or from the adjacent lateral planes are greater. They may be arranged in whatever direction, transversally, longitudinally, but it is preferable to arrange them substantially in directions radial to the axis of the screw. The blades may be pivoted about axes of rotation substantially perpendicular to the axis of the sustaining screw.

Their function is chiefly effective by vertical flights as will be explained later on and, as a result, by high speed flights in a substantially horizontal direction, there may be advantage to make the whole or part of these blades inoperative by applying them against the walls of the body which are arranged with a view thereto. For that purpose, the blades may be carried by supports pivoted on the body, such supports being provided so as to allow the rotation of the blades proper about the axes of rotation perpendicular to the axis of the screw.

3. As an optional and complementary feature:

A forward extension of the body which may reach or even project beyond the limit of the circle swept over by the screw. As the body may be streamlined vertically so as to offer only the least possible resistance to the air threads forced back by the screw, it thus contributes, by its very presence, to facilitate the vertical flight. This property may be explained by the action, on the surrounding air, of the considerable vertical surface provided by the body at the front and rear of the axis of the screw. This action sets up a resistance to the rotational movement that the body would take about the axis of the screw when the latter is actuated by the engine or engines and it assists, together with the action of the lateral planes and, eventually, of the blades, in counteracting such rotational movement.

4. As an optional feature:

One or more surfaces, hereinafter termed vertical tails, preferably arranged towards the rear of the apparatus, substantially parallel with the longitudinal plane of the body or as an extension thereof. These surfaces, which are movable about one or more substantially vertical axes of rotation, are controlled by the pilot as described below.

5. As an optional feature, one or more surfaces hereinafter termed horizontal tails; preferably disposed towards the rear of the apparatus and substantially horizontal. These surfaces are movable about one or more substantially horizontal axes of rotation which are substantially perpendicular to the vertical median plane of the body. As their action during the vertical motion may be disadvantageous, as will be explained later on, the supports of those surfaces which constitute the horizontal tail may be hinged to the body so as to enable the pilot, by vertical flight, either to make them inoperative by placing them vertically, or to allow them to assume by themselves their own positions and thus to remain without notable action upon the balance of the apparatus (see Figures 3, 4 and 12).

6. A group of controlling members, hereinafter termed speed variation controls, enabling the pilot to adapt the apparatus to the desired kind of flight either in the case of a vertical flight or if he desires to obtain a more or less rapid horizontal translation. The controlling lever, which is for instance not limitative of such speed variation, will be placed by the pilot in various positions according to the kind of flight and will actuate the above described devices either directly or through the hereinafter disclosed controlling members.

For vertical flight, the lateral planes will be placed by the speed variation controls in a substantially vertical position. This position may be slightly different of the planes located on either side of the apparatus so as to increase to a maximum the resistance opposed by these nearly vertical planes to the tendency of the body to turn in the direction contrary to that of the screw. For that purpose, the planes on one side will be slightly inclined, e. g., towards the rear of the apparatus and the opposed planes slightly inclined towards the front thereof.

For a more or less rapid horizontal flight, the lateral planes will be progressively placed, by the action of the speed variation controls, into positions progressively approaching the horizontal. These positions will be set so that the planes may be substantially in the direction of the path of the air threads coming out of the screw, when the apparatus reaches the desired translation speed. Here again, there may be advantage for the planes to be set differently on either side of the body because, while progressing, the sustaining screw is less effective on that side of the body where the translation lessens the relative speed of the screw blades with respect to the surrounding air. By reducing on that very side the horizontality of the lateral planes, there will be obtained a sustaining action of the air on these planes by which at least part of the loss of sustension undergone by the screw will be compensated. On the other hand, some amongst the hereinafter described stability and direction controlling members must have a progressively increasing or decreasing action as the speed of horizontal translation of the apparatus increases. For that purpose, a group of connections are provided between the speed variation controlling member and the stability and direction controlling members so that the action of the latter upon the controlled members may be stronger and stronger or weaker and weaker according to the necessities particular to each kind of flight and the methods of setting defined below.

Last, by rapid translations, it may be useful to complete the action of the lateral planes in their effect of compensation for the inequalities in the distribution of the sustaining pull of the screw.

For that purpose, the speed variation controlling member may optionally actuate in progressive manner a device by which the pitch of the screw blades is reduced when they pass on that side of the body where the rotational speed of the blades is added to the translation speed of the apparatus, said pitch being increased correlatively in the diametrically opposed sector; by vertical flight, such variation in the pitch of the screw blades does not take place; it conversely takes place with intensity when the desired speed is considerable (see the diagram in Figures 7 and 8).

7. A group of controlling members hereinafter termed direction controls, which enable the pilot to act upon the above described devices so as to orient and steer the apparatus as he chooses to.

These controlling members act in constant or variable manner according to whether they are, or are not, connected to the speed variation controls as described above (see the diagrams in Figures 7 and 8):

*(a) Constant control*

The pilot's action being exerted on a double armed rocking lever which, for instance, is not limitative, is transmitted to the vertical tail in such manner that, in order to turn, say, to the left, the surface or surfaces of the tail (as seen from the top of the apparatus) may turn clockwise. The resulting effect is similar to that of the steering rudder in a conventional airplane, but effective only by horizontal flights; by vertical flight the controlling member is ineffective.

(b) Variable controls

The pilot's action is transmitted, with variable intensity, both to the lateral planes, or preferably (and if there is matter therefor) to the winglets and the blades. By vertical flight, the lateral planes and the blades are arranged substantially vertically as has been indicated above. In order to turn, the pilot's action on the controlling member will bring about a more or less extended rotation of the lateral planes or, preferably, their winglets, and of the blades located on one side of the body, together with a reverse rotation of the planes, or winglets, and blades located on the other side. Such action will be reduced progressively by the speed variation control member and will be cancelled at high speeds when the vertical tail attains its full effectiveness. On the other hand, at that time, it will eventually be possible for the pilot to conceal the now useless blades against the body.

8. A group of controlling members hereinafter termed longitudinal stability controls, which enable the pilot to at will tip up or down the longitudinal axis of the apparatus.

Starting from an originally vertical flight towards increasing horizontal speeds, these control members may be divided into two groups, viz.: the decreasing controls and the increasing controls (see the diagrams in Figures 7 and 8).

(a) Decreasing controls

The periodical transversal variation in the pitch of the screw is utilized by vertical flight to obtain the longitudinal stability of the apparatus. By vertical flight, this variation namely produces a lack of balance between the sustaining actions exerted by the screw on either side of the body; the result thereof is a torque which tends to tilt the body transversally. The action of such torque on the gyroscope provided by the screw blades brings about a precessional movement of that gyroscope and, consequently, the tipping up or down of the nose of the body.

By translation at increasing speed, such control is progressively annihilated by the action of the speed variation control, so as to leave its whole magnitude to the compensating effect for the lack of balance of the screw as described above.

(b) Increasing controls

As the above control becomes annihilated, the following controls are progressively called into play by the action of the speed variation control.

As stated above, the lateral planes are the nearer to the horizontal position as the desired speed is greater. Consequently, by increasing the incidence of the planes on one side of the body (or by acting upon the winglets of these planes) and correlatively reducing the incidence of the planes (or winglets) on the other side, the pilot sets up a torque acting transversally upon the lateral planes. This torque which is transmitted to the body brings about by gyroscopical precession the contemplated stabilizing movement.

Said control, which is annihilated by vertical flight, becomes more and more effective at high speeds of translation by the action of the speed variation control (see the diagrams in Figures 7 and 8).

Nevertheless, the above device involves some kind of correction, as the lateral planes do not reach, even at high speed, a wholly horizontal position. It follows that, by producing the torque of transversal forces intended to stabilize the apparatus, the pilot sets up at the same time a torque of horizontal forces which are liable to disturb the direction of the apparatus. In order to compensate this parasitic effect, there is provided a controlling member the action of which is correlated to the former and which actuates the vertical tail of the apparatus; the pilot is thus enabled to automatically compensate, by the action of said tail, the direction-perturbating horizontal torque.

It may be noted that the last named control, which is annihilated by vertical flight, must act with full intensity by rapid horizontal flight. It may thus, according to the circumstances, either be controlled in progressively increasing manner or, if it is desired to simplify the construction, be actuated in constant manner and independently from the speed variation controls. Its effectiveness will then depend directly on the translation speed of the apparatus, i. e. be null by vertical flight and maximum by high speed (see the diagrams in Figure 7, dotted line indications).

9. A group of control members hereinafter termed transversal stability controls, enabling the pilot to at will tilt or level the apparatus transversally. Similarly to the direction controls, these may be subdivided into constant controls and variable controls.

(a) Constant controls

The pilot's action is exerted through these controls upon the incidence of the surfaces constituting the horizontal tail, so that the action of the air as results from the movement of the apparatus along a horizontal path may produce on the surfaces a vertical effort. The pilot thus sets up a torque of forces applied in the longitudinal plane of the apparatus and said torque, being transmitted to the body, causes a precession of the gyroscope provided by the screw, thus producing the expected stabilizing transversal movement.

By vertical flight, the action of this horizontal tail is nearly negligible; they must thus be made good and this is the object of the variable controls.

(b) Variable controls

The pilot acts upon a device similar to that described with reference to the speed variation controls and the longitudinal stability controls, which device periodically produces a variation in the pitch of the screw, the pitch of one blade being increased when passing through the mean plane of the body, the pitch of the diametrically opposed blade being decreased correlatively. Thus, a torque of forces is set up which tends to cause the body to tilt longitudinally, bringing about a precessional rotation of the gyroscope provided by the screw and producing the desired transversal stabilizing movement. This control acts with full intensity by vertical flight; its effectiveness is progressively reduced by the action of the speed variation control as the action of the horizontal tail is called into play by the translation speed of the apparatus.

10. Optionally, a group of controls hereinafter termed gliding controls, intended to enable the pilot, should the screw break or stop, to utilize the bearing capacity of the lateral planes to glide and land similarly to an airplane of conventional construction, while using the above described stability controls (the speed variation controls being placed in the position of highest horizontal translation speed).

These controls comprise, essentially, a reversing device arranged so that the group of members actuated by the longitudinal stability controls passes under the action of the transversal stability controls and vice-versa; such reversing device is made necessary by the fact that, as the gyroscopic action of the screw is annihilated, it is necessary that there should be employed, for the transversal stabilization of the apparatus, the transversal torque developed upon the lateral planes, and similarly, for the longitudinal stabilization of the apparatus, the longitudinal torque set up by the action of the horizontal tail.

11. Optionally, a special device for the control of the horizontal tail which is arranged so as to avoid the disturbances brought about by the atmospheric whirls and gusts.

By horizontal flight, the screw being in action, such abnormal atmospheric phenomena produce upon the horizontal tail substantially vertical actions which, through gyroscopic precession, bring about a transversal rolling movement of the apparatus.

To obviate such inconvenience, the horizontal tail is normally pivoted on the body so as to be free to swivel under the action of the disturbances without the effect thereof being transmitted to the body. When the control actuated by the pilot is brought into play, it causes a previously inoperative yielding device by which the tail is connected to the body to be put under tension (or compression) so that the action of said tail bears a determined ratio with the intensity of tension or compression of the yielding transmission system (see Figure 12).

12. A connecting device for the controls leading to each member provided so that each one of said controls may have an independent action and that the controlled member may receive the resultant of both elementary actions. Such arrangement is applied:—

(a) To the winglets of the lateral planes, by combining the action of the direction controls with that of the longitudinal direction and stability controls.

(b) To the vertical tail, by combining the action of the direction controls with that of the longitudinal stability controls.

(c) To the device for the periodical transversal variation of the screw pitch, by combining the action of the speed variation control with that of the longitudinal stability control (see thereabout the diagram in Figure 7).

In the drawings annexed to this description, the figures show, by way of example, not limitatively, embodiments of the devices constituting the apparatus, the general characteristics of which are given above.

Figures 1$^A$ and 1$^B$ are longitudinal cross section of the front part of an helicopter-airplane.

Figures 1$^C$ and 1$^D$ show parts of Figures 1 and 1$^B$ on an enlarged scale.

Figure 2 is a side view of the same apparatus in horizontal flight position.

Figure 3 is a plan view of the same apparatus in horizontal flight position.

Figure 4 is a plan view of the same apparatus in vertical flight position.

VV means speed variation control;
DC means direction constant control;
DV means direction variable control;
LC means longitudinal stability constant control;
LK means longitudinal stability increasing control;
LD means longitudinal stability decreasing control;
TC means transversal stability constant control;
TV means transversal stability variable control;

OP means point of arrival of the lateral plane swivelling control;

A means point of arrival of the blade control;

AP means point of arrival of the lateral plane winglet controls;

QV means point of arrival of the vertical tail controls;

QH means point of arrival of the horizontal tail controls;

VT means point of arrival of the controls for the transversal periodical variation of the screw pitch;

VL means point of arrival of the control for the longitudinal periodical variation of the screw pitch.

The same abbreviations are reproduced and have the same meaning in Figures 1, 8, 9, 10, 11 and 12.

Figure 7:
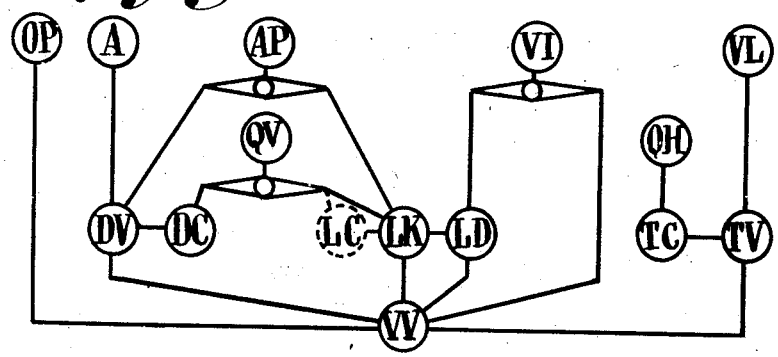
Figure 7 is a general diagram of the controls of the helicopter-airplane as shown in Figures 1 to 6 and Figures 7$^A$ and 7$^B$ jointly form an enlarged diagrammatic perspective view of a group of said controls. The meaning of the abbreviations applied to said figures being as follows.

Figure 8 is an example of a fragmentary diagrammatic embodiment of the controls according to Figure 7.

Figure 9 is a diagrammatical perspective view of an example of an embodiment of the gliding controls.

Figure 10 is a diagrammatic perspective view as an example of an embodiment of the controls for the swivelling of the lateral planes and the actuation of the winglets thereof.

Figure 11 is a diagrammatic perspective view as an example of an embodiment of the controls for the blades and the concealing system thereof.

Figure 12 is a diagrammatic perspective view of an embodiment of the horizontal tail controls.

Figure 13:
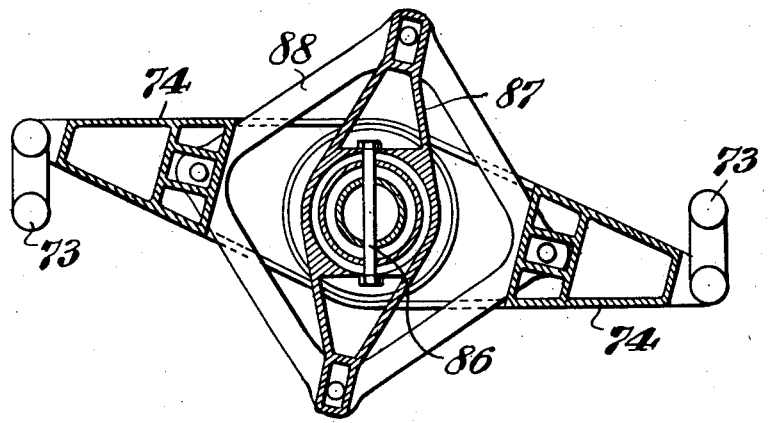

Figure 13 is a horizontal cross section taken on the broken line B—B—B—B of Figure 1$^B$.

Figure 14:
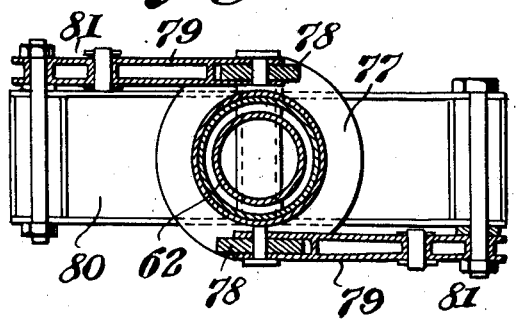

Figure 14 is a horizontal cross section taken on line EE of Figure 1$^B$.

Figure 15:
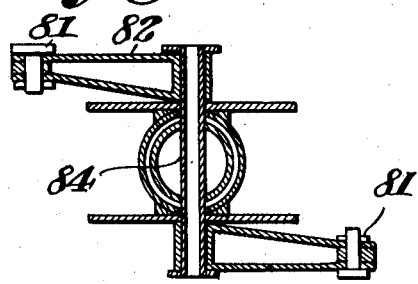

Figure 15 is a horizontal cross section taken on line GG of Figure 1$^B$.

Figure 16:
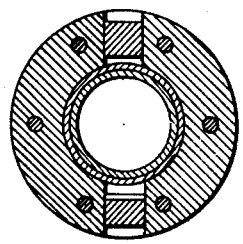

Figure 16 is a horizontal cross section taken on line HH of Figure 1$^B$.

Figure 17:
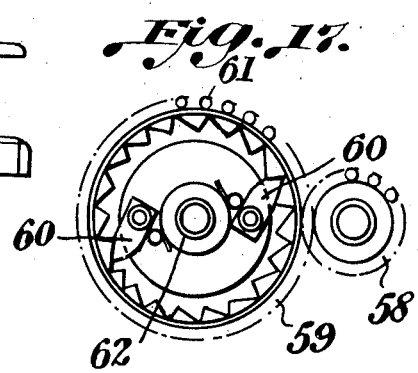

Figure 17 is a horizontal cross section taken on line JJ of Figure 1$^B$.

Figure 18:
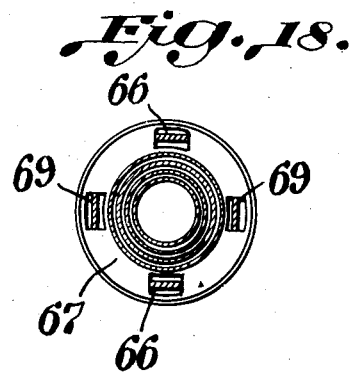

Figure 18 is a horizontal cross section taken on line MM of Figure 1$^B$.

Figure 19 is a horizontal cross section taken on line RR of Figure 1$^B$.

Figures 13$^A$–19$^A$ are reproductions, on a larger scale, of Figures 13–19, respectively.

In the embodiment referred to in Figures 1 to 6, the bevel pairs 52, 53, 54, 55 and the trains of gears 56, 57, 58, 59 are driven by the engines 50 and 51 respectively (see also Figure 17); the gears 57 and 59 are solid with two ratchet devices respectively, the driving pawls 60 of which allow the screw to continue its rotational movement even if the corresponding engine should happen to stop. The driving pawls 60 drive a hollow shaft 61 concentrical with the axis of the screw 62 and support the latter by means of a Cardan's collar 63 (see Figure 19). Shaft 61 carries a collar 64 clamped by upper and lower ball bearings integral with the general casing 65. The collar 64 thus transmits to the casing 65 and from there to the apparatus the traction efforts of the screw. The shaft 61 carries at the upper part thereof driving tenons 66 (see Figure 18) acting upon a collar 67 which transmits the movement to tenons 69 solid with shaft 62. This so arranged device allows of the slight displacements of shaft 62, within shaft 61, caused by the deformations of the body, yet without being detrimental to the driving effect. Shaft 62 is formed at the end thereof with a head 70 into which shaft 71 is slipped, about which the central ribs 72 of the screw blades are journalled. The rotation of said blades and the corresponding variations of the screw pitch are produced by means of tenons 73 (Figures 1 and 13) solid with ribs 72. These tenons 73 are actuated through a transversal lever 74. This lever is pivoted in a support 75 carrying rows of axially vertical ball bearings, and this support 75 is adapted to be shifted longitudinally or transversally with respect to the body by the pilot's action upon the controls such as VT or VL (not shown). There is obtained thus a certain amount of eccentricity of lever 74 with respect to the axis of the screw and, consequently, a periodical either transversal or longitudinal variation of the pitch of the screw.

The pilot can vary the pitch of the screw by flight in the following manner. By actuating a lever 76, the pilot causes a pulley 77 (Figures 1 and 14) and two rollers 78 carried by two levers 79 to ascend or descend; the latter are pivoted on supports 80 solid with the screw shaft 62. The levers 79 actuate two links 81 (Figures 1, 14 and 15) which act upon bell crank levers 82 (Figures 1, 15 and 16) the lower extremity of which is inserted in a ring 83. Said ring is solid with shaft 61. It follows that, by causing the pulley 77 to ascend or descend, the pilot produces, through the action of the bell crank levers 82, a slight relative rotation of shaft 61 with respect to shaft 62. These relative movements are transmitted from shaft 61 to an inner shaft 84 (Figures 1, 15 and 19) through a transversal spindle 85 loosely projecting through shaft 62. In the course of its relative movements within shaft 62, the shaft 84 actuates at the upper part thereof a spindle 86 (Figure 13) which projects loosely through shaft 62 and which transmits its relative movement (with respect to the latter) to a lever 87 (Figure 13). This one transmits the movement to a frame 88 provided at the four apexes thereof with rollers adapted to slide in the slots of levers 87 and 74. Thus, the movement of the lever 76 actuated by the pilot results in a relative movement of slight rotations of lever 74 with respect to shaft 62, and this, whatever the eccentricity of the support 75 may be. One can therefore see that the movements of the transversal member 74 produce, to the pilot's will, variations in the pitch of the screw through their action on the tenons 73.

The devices previously described enable the pilot either to vary the pitch of both blades of the screw or to obtain periodically a variation of said pitch.

The bodily variation of pitch can be easily explained by assuming the engine stopped; then shaft 61 is motionless and so are ring 83, spindle 85, vertical shaft 84, spindle 86, lever 87, frame 88, lever 74, connecting rods 300, and the lower ends of tenons 73. If the pilot causes the pulley 77 to descend, the downward motion will extend to rollers 78, links 81, and the outer ends of crank levers 82. The lower end of lever 82 being engaged in ring 83, which is then motionless, the axis of said lever 82 will be displaced from right to left (according to Figure 1); such movement extending to shaft 62, head 70, shaft 71 and central rib 72. The bottom end of tenons 73 being motionless, the central rib will have to rotate on shaft 71, thus causing the variation of the screw pitch.

As regards the periodic variation of pitch, and supposing that the pilot actuates lever 205 (Figures 1$^B$, 1$^C$ and 7$^A$), so that the connecting rods 206 pull on support 75, this support, being linked to the fuselage by spherical-ended rods 230, will be displaced from right to left (according to Figure 1), and so will the lever 74, while the apex rollers in frame 88 will slide in their slots. The connecting rods 300 follow the motion of lever 74 and will simply turn loosely around tenons 73, and thus will not cause a substantial variation of the pitch.

On the contrary, if the pilot actuates the connecting rods 229 (Figures 1$^B$, 1$^C$ and 7$^A$), both ends of lever 74 will be displaced—for instance, towards the top of Figure 13$^A$; the connecting rods 300 and the lower ends of tenons 73 will be moved transversely to shaft 71, both in the same direction; and since shaft 71 is unaffected by the movement, both central ribs 72 will rotate on shaft 71, thus increasing the pitch of one blade and at the same time reducing the pitch of the other blade.

It is thus easily seen that the lateral motion of support 75 produces, when the movement of the support is parallel or perpendicular to shaft 71, an effect altogether different. Hence, the pitch of the blade will vary periodically if support 75 is permanently shifted laterally, while the screw (including shaft 71) is set in rotation.

Figure 5:
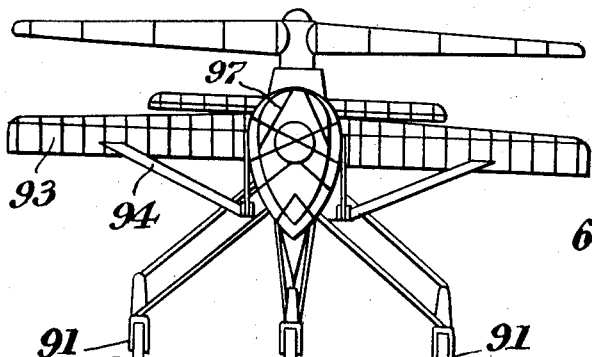
Figure 5 is a front view of the same apparatus in horizontal flight position.
Figure 6:
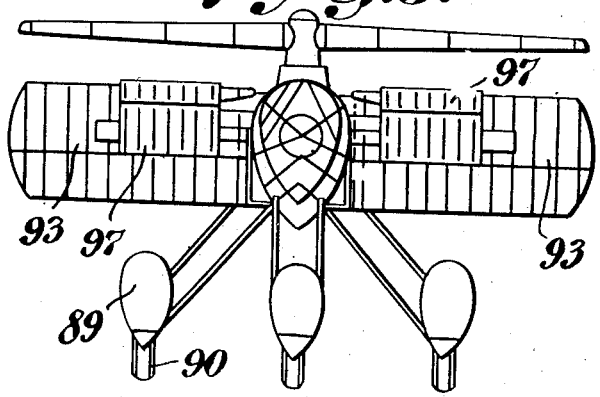
Figure 6 is a front view of the same apparatus in vertical flight position.

Figure 2 shows an helicopter-airplane in rapid flight position; such is also the case with Figure 3 and Figure 5. In the latter, the helicopter-airplane is shown as provided with a ground landing train whereas in Figure 2 it has an amphibious landing train constituted by floaters 89 provided with automatically swingable wheels 90. In both cases, either the swingable landing wheels 91 (Figures 3 and 5) or the floaters 89 are connected to the body 92 by articulated and elastic devices. The lateral planes 93 are supported by sloping arms 94 movable on guide yokes 95. The rear winglets 96 extend along the whole length of the lateral planes; the blades 97 are shown as folded up against the body, either on the back part or the forward extension of the body 98. The winglets are connected to the body by means of the hinge pins 99. The vertical tail is constituted by one single rudder 100. The horizontal tail comprises two surfaces 101 held by arms 102 pivoted to the body by means of a pin prolongating the articulation axis of the surfaces 101. The upper orifices 103 afford the cooling of the engines or of the radiators 104 (Figure 1). In Figures 4 and 6 there is shown an amphibious helicopter-airplane by vertical flight; the lateral planes and blades are substantially vertical, the latter being swung away from the body.

It may be seen in Figure 7 that the speed variation control VV actuates the swivelling of the lateral planes OP directly, produces the progressive variation of the direction control DV, the increase or decrease of the action of the longitudinal stability controls LK or LD, the adjustment of the transversal periodical pitch variation control VT and the progressive variation of the transversal stability control TV. The variable direction control DV actuates the blades A and the winglets AP, which also receive the increasing action of the longitudinal stability control LK. The direction constant control DC acts upon the vertical tail QV which is also actuated (for compensation purposes) by the longitudinal stability controls (increasing control LK or constant control LC, at will). The longitudinal stability decreasing control LD acts upon the screw pitch periodical transversal variation device VT which, in addition, receives the direct action of the speed variation control VV. Last, the transversal stability constant control TC actuates the horizontal tail QH directly and the transversal stability variable control TV actuates the screw pitch longitudinal periodical variation VL directly.

In Figure 8 the lever VV for the speed variation acts upon a system of rods 105, 106, 107 and 108 which cause the extremities of controls 109, 110, 111 and 112 to move in the slots of the three levers 113, 114 and 115, these swing about pins 116, 117 and 118, under the action of the direction control DC for lever 113, of the longitudinal stability control LC for lever 114, of the transversal stability control TC for lever 115. On the other hand, a rod 119 actuates a bell-crank lever 120. It is easy to see that such arrangement embodies the diagram of Figure 7. The control 109 effecting the direction variable control DV, the control 110 effecting the longitudinal stability increasing control LK, the control 111 effecting the longitudinal stability decreasing control LD, the control 112 effecting the transversal stability variable control TV, the lever 113 effecting the direction constant control DC, the lever 114 effecting the longitudinal stability constant control LC, the lever 115 effecting the transversal stability constant control TC directly, and the lever 120 effecting the lateral plane swivelling control OP.

In Figures 9, 10, 11 and 12, the brasses coloured black must be considered as integral with the body.

In Figure 9, the transversal and longitudinal stabilities are provided for by the pilot's action upon a lever 121. By acting in the longitudinal direction the pilot moves one extremity 122 of a pair of slotted levers 123 and 124; by acting in the transversal direction, the pilot moves the other end 125 of the same group of levers. A rod 126 attached through connection TC to lever 115 (Figure 8) moves in the slot of lever 123 and a rod 127 attached through connection LC to lever 114 (Figure 8) slides in the slot of lever 124; when the pilot desires to pass over to sliding position with stopped screw, he acts upon a rod 128, upon a bell-crank lever 129 and, through push rods 130, 131, upon links 126, 127; the rod 126 being brought towards the extremity 122 and the rod 126 towards the extremity 125, it is obvious that, at that time, the controls are reversed.

In Figure 10 the lateral planes 93 are swung by means of connection OP acting upon a vertical upright 132; a latch 133, controlled by means of a cable 134, projects by each flight position into notches 135 of guide yoke 95. The winglets are controlled by means of connections AP acting through return pulleys upon upright 136 solid with winglet 96.

In Figure 11 the blades 97 are pivoted on the arm 137 integral with shaft 99 secured to the body. The arm 137 depends on connection OP. The control for winglets A acts through a spherical head 138 upon sleeve 139 which carries the blades and surrounds the arm 137.

In Figure 12 the surfaces 101 of the horizontal tail are carried by two shafts 140 pivoted in sleeves 141, the latter being hinged on the body; the shafts carry at one end thereof substantially horizontal levers 142 the ends of which are connected to the body by vertical rods 143. It follows that by horizontal flight, for instance, if the surfaces 101 are raised, the front parts of transverse levers 142 are lowered while the rear ends thereof remain substantially stationary and, as a result, the incidence of the surfaces 101 decreases in proportion as said surfaces are raised; the surfaces 101 thus have a tendency to assume by themselves a position of balance in which their action upon the apparatus is negligible. In their upward and downward movements the surfaces 101 act upon cables 144 and upon a double bell-crank lever 145. The latter is acted upon by a cable 146 and an elastic restorer 147 which is normally released. The cable 146 passes through a tube 148 provided at either end with pulleys 149 and hinged at 150 on the body. The tube may be actuated by the pilot through connection TC for the transverseal stability control. The operation is as follows: When the pilot actuates connection TC the pulleys 149 take the cable 146 out of the straight line and the elastic device 147 is put under tension. This tension is transmitted by cable 146 to lever 145 and causes the front ends of the transverse levers 142 to be moved up or down. The incidence of the planes 101 is then modified and the latter exert on the body a stabilizing action the intensity of which is related to the tension of the elastic system 147. When the pilot brings the control TC back into neutral position, the system 147 is again released and the action of the planes 101 upon the body ceases to be appreciable.

The pilot uses the group of controls as indicated in Figures 7ᴬ and 7ᴮ as summarized hereinafter:

*I—Speed variation controls*

(a) The lateral planes 93 are set progressively from the vertical to an approximate horizontal position when the pilot actuates the speed control VV, and thus rod OP and upright 132.

(b) The auxiliary blades are progressively applied against the body when the pilot actuates the speed control VV, and thus the rod OP and the arm 137.

(c) The periodic transverse pitch variation of the screw is progressively set in action when the pilot actuates the speed control VV, and thus rod 119, crank lever 120, rod 200, crank lever 201, lever 202, rod VT, lever 203, shaft 204, levers 205 and connecting rods 206, and thus shifts support 75.

*II—Direction control*

(a) *Constant control.*—The pilot actuates foot lever 207, cable 208, crank levers 113 and DC, rod 209, lever 210 (pivoted on the end of crank lever LC), rod QV, lever 211, cables 212 and finally rudder 100.

(b) *Variable control on lateral planes.*— The pilot actuates foot lever 207, cable 208, crank lever 113 and movable rod 109 (which is set in position according to speed control position through action of rod 105). The action of the pilot on rod 109 is progressively reduced and neutralized at high speeds; and rod 109 acts on crank lever DV, rod 213, lever 214 (pivoted on the end of crank lever KL), rod AP, lever 215, cables 216 and winglets 96.

(c) *Variable control on auxiliary blades.*— The rod 109 acts on crank lever DV, rod A, lever 138, axle 139 and blade 97.

III—Longitudinal stability controls (a) *Decreasing control.*—The pilot actuates lever 121, axle 217, rod 218, slotted lever 124, rod 127, crank lever 219, rod 220, lever 114, movable rod 111 (set in position according to control VV and rods 106 and 107), rod LD, lever 202 (pivoted on the end of crank lever 201), rod VT and, as heretofore described, parts 203, 204, 205, 206 and 75.

(b) *Increasing control on winglets 96.*— The pilot actuates lever 114, as indicated before, and, hence, movable rod 110 (parallel to rod 111), crank lever LK, lever 214 and the previously-mentioned parts AP, 215, 216 and 96.

(c) *Increasing control on rudder.*—The pilot obtains the correction, as lever 114—LC acts on lever 210 and parts QV, 211, 212 and 100.

IV—Tranverse stability controls (a) *Constant control.*—The pilot actuates lever 121, rod 221, crank 222, rod 223, slotted lever 123, rods 126 and TC, crank lever QH, cable 224, tube 148, cable 146, crank levers 145, cables 144, levers 142, sleeves 141 and surfaces 101.

(b) *Variable control (decreasing).*—The pilot actuates, as indicated before, crank lever QH and then rod 225, slotted lever 115, movable rod 112 (set in position according to control VV and rods 106, 107, 108), rods TV and VL, crank lever 226, shaft 227, lever 228, connecting rods 229, and support 75.

V—Gliding controls

The pilot actuates the crank lever 192 through the handle 128, and the connecting rods 130 and 131; the connecting rod 130 placing the rod 126 in front of the rod 218, and the connecting rod 131 placing the rod 127 in front of the rod 223, thus reversing the stability controls, as required.

I claim as my invention:

1. In a helicopter, a single vertical engine-driven shaft; a set of propeller blades fixed thereon; an elongated fuselage extending along the whole diameter of the blade-swept circle and projecting beyond the same at rear, said fuselage being rounded at top and sharp-edged at bottom; a plurality of lateral bearing surfaces provided with winglets and disposed transversely to the fuselage, said surfaces being horizontally pivoted; a vertical rudder at rear of the fuselage; a speed-variation control actuated by the pilot for inclining the lateral bearing surfaces from the vertical to a substantially-horizontal position; a direction control actuated by the pilot for rotating the rudder; a complementary direction control for inclining the winglets of said lateral surfaces; and a device combining the action of said speed variation control with that of said complementary direction control, and decreasing the action of the latter control when increasing the horizontality of the lateral bearing surfaces.

2. In a helicopter according to claim 1, a longitudinal stability control, actuated by the pilot, for causing a periodic differentiation of the pitch of the screw blades when they extend in a direction transverse to the fuselage, and a periodic equality of the pitch of the screw blades when they extend in the same direction as the fuselage; and a device combining the action of the speed variation control with that of the longitudinal stability control, and decreasing the action of the latter control when increasing the horizontality of the lateral bearing surfaces.

3. In a helicopter according to claim 1, a stability control for the winglets actuated by the pilot, and a device combining the action of the speed variation control with that of the said stability control for the winglets and increasing the action of the latter control when increasing the horizontality of the lateral bearing surfaces.

4. In a helicopter according to claim 1, a stability control for the winglets actuated by the pilot, a device combining the action of the speed variation control with that of the said stability control for the winglets and increasing the action of the latter control when increasing the horizontality of the lateral bearing surfaces; and a device enabling the pilot to incline the rudder by the operation of the stability control for the winglets and combining the action on said rudder of both the direction control and the said stability control for the winglets.

5. In a helicopter according to claim 1, a transverse stability control, actuated by the pilot, for causing a periodic differentiation of the pitch of the screw blades when said blades extend in the same direction as the fuselage, and a periodic equality of the pitch of said blades when they extend in a direction transverse to the fuselage.

6. In a helicopter according to claim 1, a plurality of substantially vertical auxiliary blades pivoted on horizontal axles, said axles being hinged to the fuselage so that said auxiliary blades may be set flat against the fuselage; a plurality of substantially horizontal tail surfaces disposed in rear of the fuselage, said tail surfaces being horizontally pivoted on transverse axles swinging up and down, said swinging axles being hinged to the fuselage; and a device for adjusting automatically the pitch of said tail surfaces according to the position assumed by said swinging axles.

7. In a helicopter according to claim 1, a plurality of substantially vertical auxiliary blades pivoted on horizontal axles, said axles being hinged to the fuselage so that said auxiliary blades may be set flat against the fuselage; a plurality of substantially horizontal tail surfaces disposed in rear of the fuselage, said tail surfaces being horizontally pivoted on transverse axles swinging up and down, said swinging axles being hinged to the fuselage; a device for adjusting automatically the pitch of said tail surfaces according to the position assumed by said swinging axles; a device combining the complementary direction control with the speed variation control for inclining the auxiliary blades on their axes; and a device combined with the speed variation control for applying progressively the auxiliary blades against the fuselage when increasing the horizontality of the lateral bearing surfaces.

8. In a helicopter according to claim 1, a plurality of substantially vertical auxiliary blades pivoted on horizontal axles, said axles being hinged to the fuselage so that said auxiliary blades may be set flat against the fuselage; a plurality of substantially horizontal tail surfaces disposed in rear of the fuselage, said tail surfaces being horizontally pivoted on transverse axles swinging up and down, said swinging axles being hinged to the fuselage; a device for adjusting automatically the pitch of said tail surfaces according to the position assumed by said swinging axles; an elastic device; and a tail control enabling the pilot to actuate said elastic device and thereby cause the swinging of the axles supporting the tail surfaces.

9. In a helicopter according to claim 1, a plurality of substantially vertical auxiliary blades pivoted on horizontal axles, said axles being hinged to the fuselage so that said auxiliary blades may be set flat against the fuselage; a plurality of substantially horizontal tail surfaces disposed in rear of the fuselage, said tail surfaces being horizontally pivoted on transverse axles which swing up and down and are hinged to the fuselage; a steering lever; a tail control actuated by the pilot when causing a displacement of the steering lever transversely of the fuselage; a stability control for the winglets actuated by the pilot when causing a displacement of said steering lever longitudinally of the fuselage; and a reversing device operable by the pilot to effect a longitudinal displacement of the steering lever to control the movements of the tail surfaces, and a transverse displacement of said lever to control the movements of the winglets.

10. In a helicopter according to claim 1, a screw pitch variation control, embodying a non-rotative pulley on the vertical screw shaft; a control actuated by the pilot for shifting said pulley vertically along the shaft; rollers displaceable by said pulley; a set of levers rotating with the screw shaft and actuated by said rollers; an internal shaft caused by said rollers to move inside the screw shaft; and a transverse lever connected with said internal shaft and itself connected with the screw blades.

11. In a helicopter according to claim 1, a periodic screw pitch variation control embodying a lever concentric with the screw shaft and provided with slots at both ends; a box provided with antifriction devices; a control actuated by the pilot for shifting said box horizontally in any direction; an external lever freely rotating in said box and having slots therein which are disposed at right angles with the slots of the concentric lever; a connecting frame provided at its apexes with rollers sliding in said slots; and rods connecting both ends of the external lever with the screw blades.

12. In a helicopter according to claim 1, a plurality of one-way shaft-driving devices, each embodying an external driving member rotating in connection with a single engine; an internal driven member concentric with the external member and with the screw shaft and rotating in connection with said screw shaft; and a plurality of connecting members fixed on one of said members and capable either of sliding in one direction on that member or of driving it in the reverse direction.

In testimony whereof I affix my signature.
EDOUARD ALFRED PERRIN.